United States Patent
Phillipps

[11] Patent Number: 6,137,481
[45] Date of Patent: Oct. 24, 2000

[54] PORTABLE COMPUTER HAVING POWER SAVING PROVISIONS

[76] Inventor: John Quentin Phillipps, 30 Mount Avenue, Ealing, London W5 2 2QJ, United Kingdom

[21] Appl. No.: 08/988,363

[22] Filed: Dec. 10, 1997

[30] Foreign Application Priority Data

Dec. 12, 1996 [GB] United Kingdom ............ 9625801

[51] Int. Cl.[7] .................................................. G09G 5/00
[52] U.S. Cl. ........................................... 345/173; 345/179
[58] Field of Search ................................. 345/173, 104, 345/179, 302, 508, 509, 905; 344/707; 361/683

[56] References Cited

U.S. PATENT DOCUMENTS

| | | | |
|---|---|---|---|
| 4,720,781 | 1/1988 | Crossland et al. | 340/825.35 |
| 5,315,695 | 5/1994 | Saito et al. | 345/432 |
| 5,394,166 | 2/1995 | Shimada | 345/98 |
| 5,406,306 | 4/1995 | Siann et al. | 345/115 |
| 5,506,604 | 4/1996 | Nally et al. | 345/154 |
| 5,511,201 | 4/1996 | Kamimaki et al. | 395/750 |
| 5,528,266 | 6/1996 | Arbeitman et al. | 345/173 |
| 5,589,848 | 12/1996 | Shimizu | 345/102 |
| 5,661,632 | 8/1997 | Register | 361/683 |
| 5,710,576 | 1/1998 | Nishiyama et al. | 345/905 |
| 5,739,814 | 4/1998 | Ohara et al. | 345/173 |
| 5,777,631 | 7/1998 | Greene et al. | 345/509 |
| 5,841,437 | 11/1998 | Fishkin et al. | 345/346 |
| 5,867,140 | 2/1999 | Rader . | |

FOREIGN PATENT DOCUMENTS

0474231 A2   11/1992   United Kingdom .
0609843 A1   10/1994   United Kingdom .

*Primary Examiner*—Mark R. Powell
*Assistant Examiner*—Anthony Blackman
*Attorney, Agent, or Firm*—John P McMahon

[57] ABSTRACT

A portable computer apparatus (1), such as a PDA, has an LCD(3). The LCD(3) can be operated in two modes. In one mode, only a portion of the LCD(3) is active whereas in the other mode, the whole LCD(3) is active. When the apparatus (1) is switched on, it operates according to a first operating program which uses only a portion of the LCD(3). The user may then instruct the apparatus to operate according to a second operating program and use the whole LCD(3).

11 Claims, 5 Drawing Sheets

PORTABLE COMPUTER HAVING POWER SAVING PROVISIONS

FIELD OF THE INVENTION

The present invention relates to portable computer apparatus.

BACKGROUND TO THE INVENTION

The present invention relates to portable computer apparatus. Portable computer apparatus is generally powered by batteries. One problem with conventional batteries is that total battery life must be balanced against weight. For instance, it would be possible to build a portable computer apparatus that could operate continuously for a month. However, the weight of batteries required would deprive the computer of its portability.

The displays of portable computers are relatively power-hungry, particularly in the case of back-lit LCDs. This problem has been addressed by providing a display timeout function whereby the display is turned off if no user inputs are received for a predetermined period.

Another proposed solution is given in EP-A-0 474 231. The document proposes shrinking the displayed image if no user inputs are received for a predetermined period. Consequently, the power demanded by the display is reduced.

A disadvantage of this approach is that the whole of the display must be used when a user is inputting commands or data, regardless of whether the full display is necessary for the task in hand.

It is an aim of the present invention to overcome the aforementioned disadvantages of prior art portable computer apparatus.

SUMMARY OF THE INVENTION

According to the present invention, there is provided a portable computer apparatus comprising a display, user operable means, memory means storing first and second operating programs and processing means, wherein the processing means is responsive to a control signal to operate according to the first operating program whereby the processing means is further responsive to the user operable means to operate according to the second operating program, wherein only a portion of the display is used during operation according to the first operating program and the whole display is used during operation according to the second operating program.

Preferably, the display comprises a back-lit liquid crystal display panel. More preferably, the apparatus includes a plurality of light sources for back-lighting the display panel, and the processing means is operable to energize a subset of the light sources when operating according to the first operating program and to energize all of the light sources when operating according to the second operating program.

Conveniently, the control signal is generated in response to operation of a power on/off switch.

The control signal could be generated by an IR sensor or even a radio signal, for instance if the computer apparatus were to be embodied in a portable telephone. A portion of the display could then be used to display a pager message or an e-mail message.

Preferably, the user operable means includes a digitizer tablet means and pen. Conveniently, the digitizer tablet means overlies the display. A keyboard or keypad may be used instead of or in addition to the digitizer tablet.

Advantageously, an apparatus according to the present invention may comprise first and second hingedly coupled body portions wherein the display is distributed between the body portions. In this case, the user operable means may conveniently comprise a hinge coupling the body portions.

The first and second operating programs may be different aspects of an overall control program.

Preferably, the second operating program is a general purpose GUI operating system for instance Pen Windows of Microsoft Corporation or the Newton OS of Apple Corporation. The first operating program provides a fixed number of tools, for instance a calculator, a diary and an address book.

According to the present invention, there is also provided a portable computer apparatus comprising a display, user input means and processing means, wherein the processing means is operable to display information using the whole of the display or a portion thereof and is responsive to operation of the user input means to perform data processing when said portion only of the display is being used.

BRIEF DESCRIPTION OF DRAWINGS

FIG. 4 is composed of FIGS. 4(a) and 4(b), wherein

DESCRIPTION OF PREFERRED EMBODIMENTS

Embodiments of the present invention will now be described, by way of example, with reference to the accompanying drawings.

Figure 1:
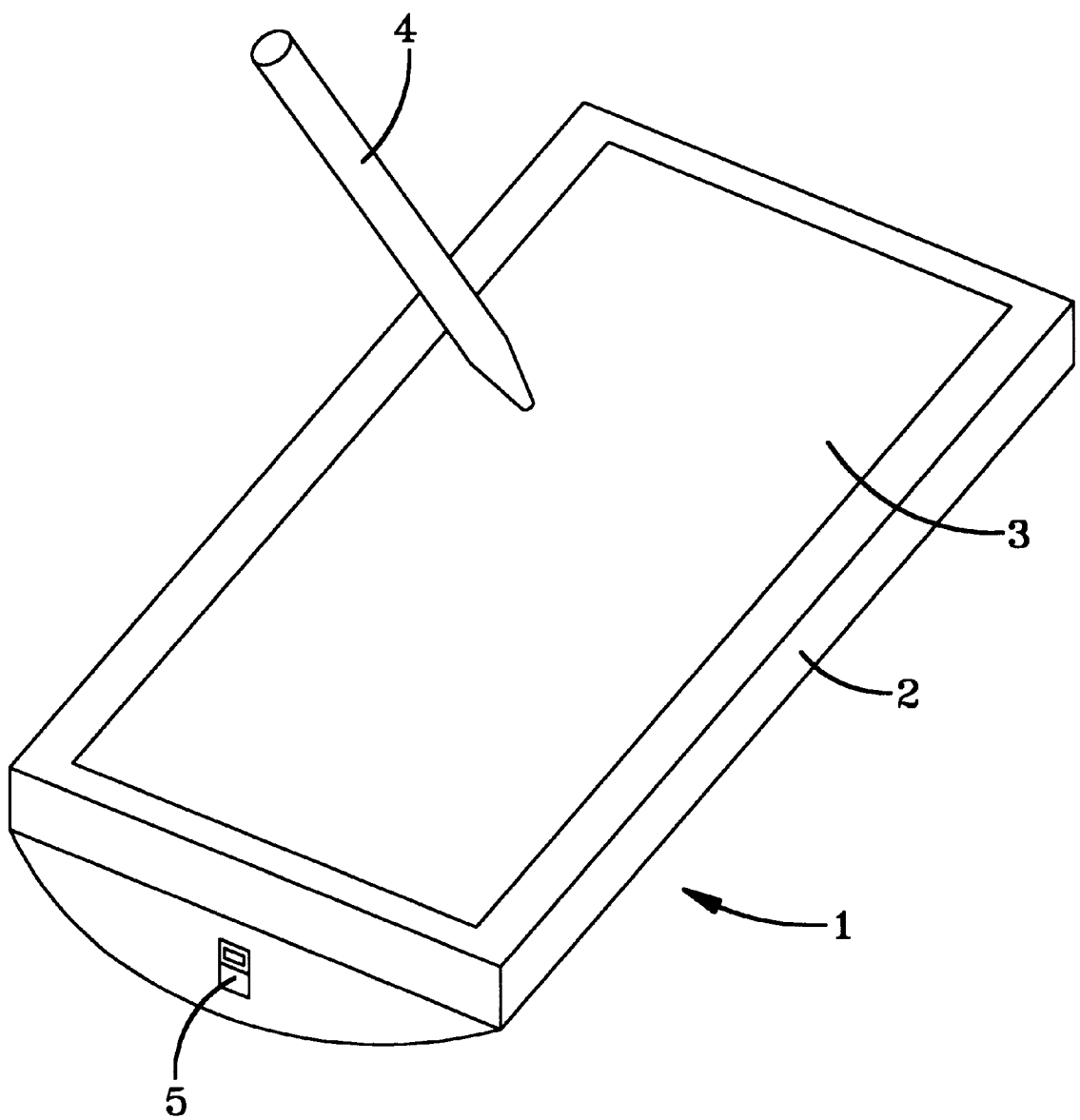
FIG. 1 shows a PDA according to the present invention.

Referring to FIG. 1, a personal digital assistant (PDA) 1 comprises a moulded plastic body 2 and a combined digitizer tablet/LCD panel 3 set into one face of the body 2.

A pen 4 is provided for use with the combined digitizer tablet/LCD panel 3. A power on/off switch 5 is located in an end face of the body 2.

Figure 2:
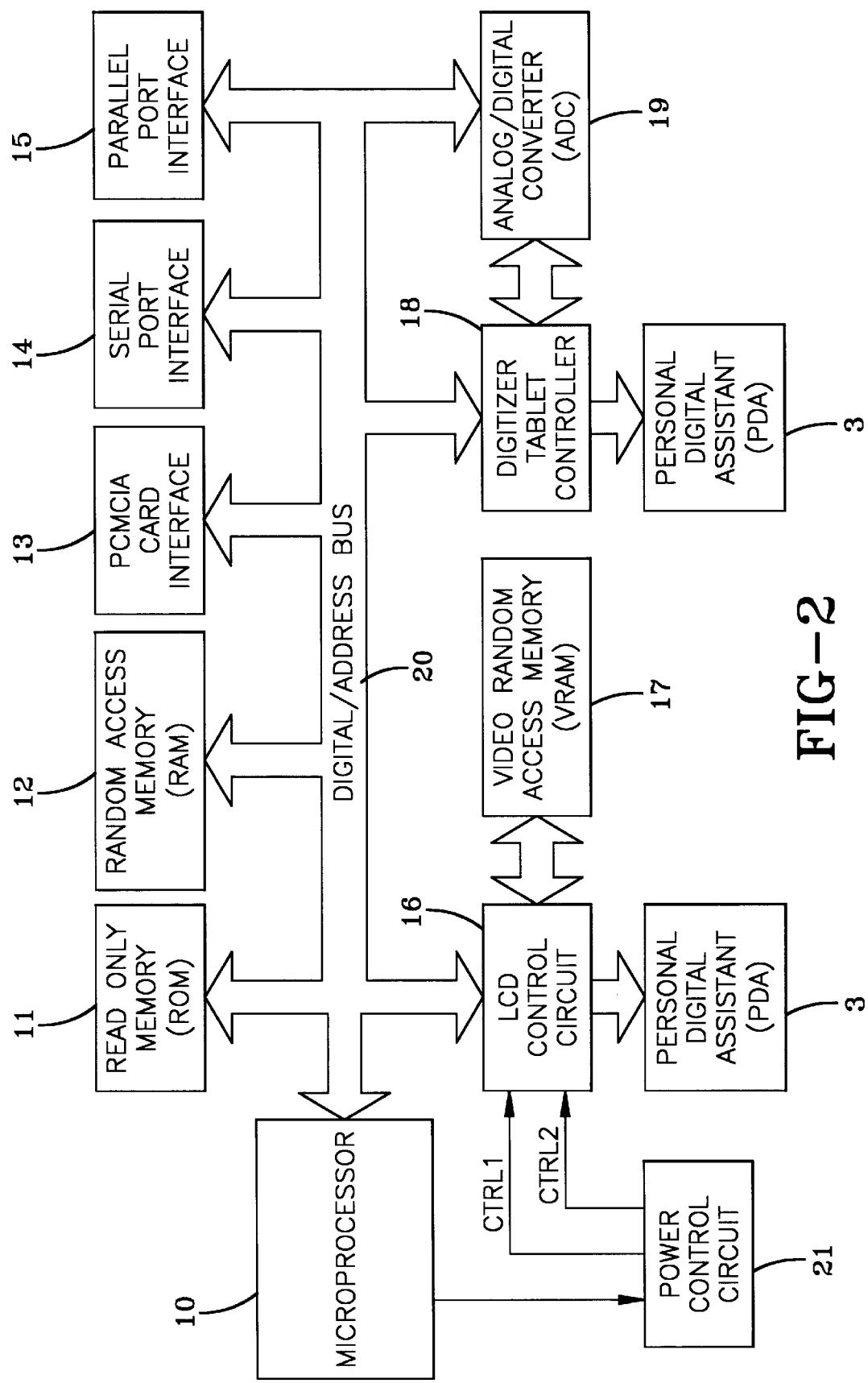
FIG. 2 is a block diagram of the electronic circuitry of the PDA of FIG. 1.

Referring to FIG. 2, the electronic circuitry of the PDA 1 comprises a microprocessor 10, a read only memory (ROM) 11 a random access memory (RAM) 12, a PCMCIA card interface 13, a serial port interface 14, a parallel port interface 15, liquid crystal display control circuit 16, a video random access memory (VRAM) 17, a digitizer tablet controller 18 and an analogue digital converter (ADC) 19. The microprocessor 10, the ROM 11, the RAM 12, the card interface 13, the serial port interface 14, the parallel port interface 15, the liquid crystal display control circuit 16, the digitiser tablet controller 18 and the ADC 19 are interconnected by a data/address bus 20. Parallel connections are provided between the liquid crystal display control circuit 16 and the VRAM 17, and between the digitiser tablet controller 18 and the ADC 19. The liquid crystal control circuit 16 is also connected to the LCD part of the panel 3, and the digitiser tablet control circuit 18 is connected to digitiser tablet part of the panel 3. The microprocessor 10 is additionally coupled directly to power control circuit 21. The power control circuit 21 is arranged to switch the supply of power to light sources for back-lighting the panel 3. The power control circuit 21 also supplies CTRL 1 and CTRL 2 line signals to the liquid crystal display control circuit 16. The purpose of these signals will become apparent from the following description. The PDA 1 may be provided with a hard disk drive.

Figure 3:
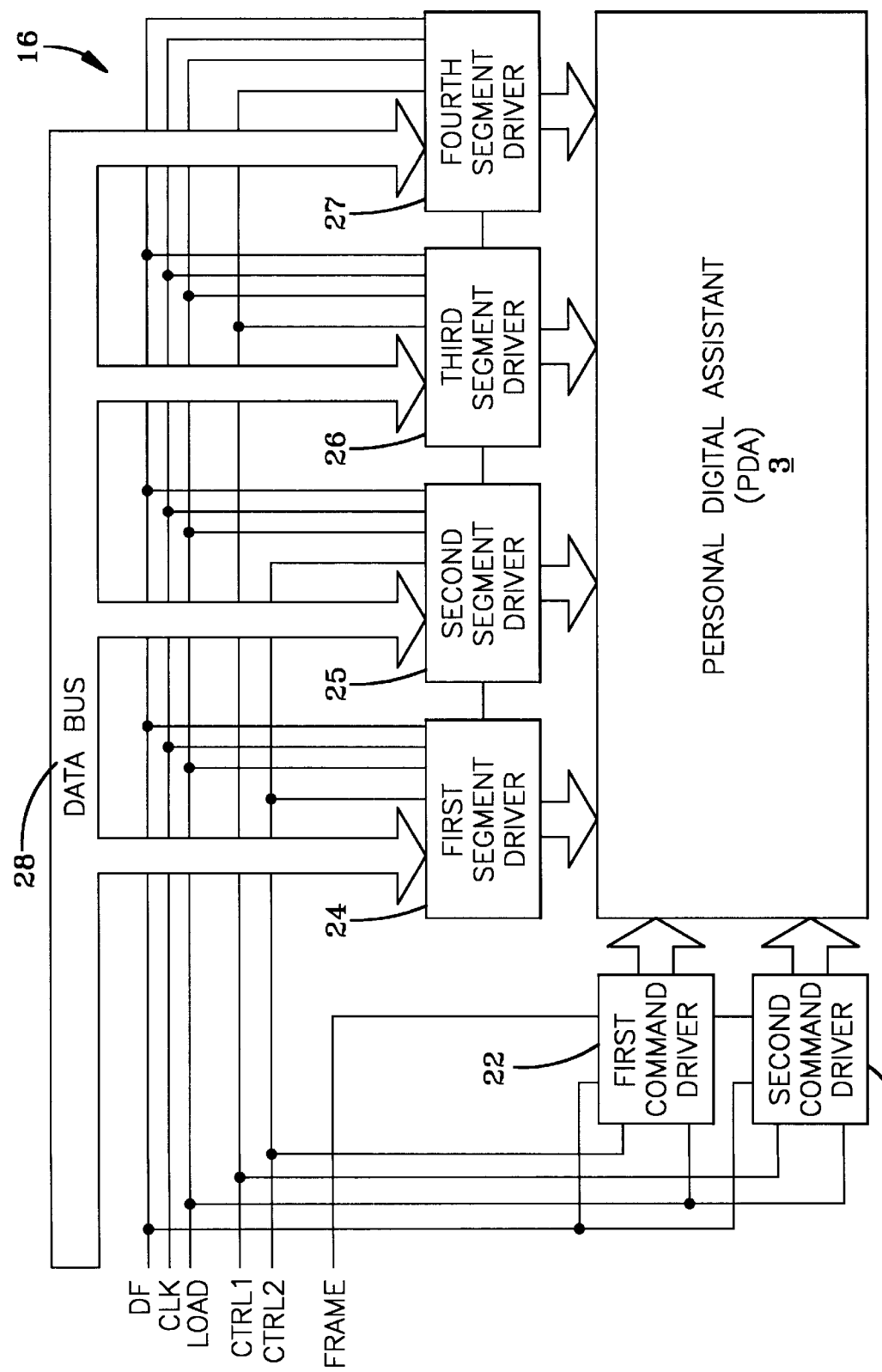
FIG. 3 is a more detailed block diagram of the display in its associated driving circuitry of the PDA of FIG. 1.

Referring to FIG. 3, the LCD panel control circuit 16 comprises first and second command drivers (e.g. MSM 5298 devices produced by Oki Electric Industry Company) 22, 23 and first, second, third and fourth segment drivers (e.g. MSM 5299 devices produced by Oki Electric Industry Company) 24, 25, 26, 27. Data, representing an image to be displayed, is applied to the segment drivers, 24, 25, 26, 27 on a data bus 28. A frame control signal is applied to the command drivers 22, 23 on line FRAME and a polarity reversing signal is applied on line DF to the segment drivers 24, 25, 26, 27. A clock signal and a load signal are applied to both the command drivers 22, 23 and the segment drivers 24, 25, 26, 27 on lines CLK and LOAD respectively. Control signals on lines CTRL 1 and CTRL 2 enable and disable the command drivers 22, 23 and the segment drivers 24, 25, 26, 27. The CTRL 1 line is used to enable and disable the second control driver 23 and the third and fourth segment drivers 26, 27, and CTRL 2 line is used to enable and disable the first command driver 22 and first and second segment drivers 24, 25.

The operation of the PDA 1 will now be described.

When the user switches on the PDA 1 by operating the on/off switch 5, the microprocessor 10 performs a boot program, stored in the ROM 11. The boot program launches a first operating program which provides, in the present example, a calculator function. In accordance with the first operating program, the microprocessor 10 outputs commands to the power control circuit 21. The power control circuit 21 responds by energizing the back-lighting light sources in one corner of the display, and applying an enable signal on CTRL 1 and a disable signal on CTRL 2. The microprocessor 10 then transfers display control data to the liquid crystal display control circuit 16 so that the image of a calculator is displayed in the illuminated portion of the LCD panel 3 (see FIG. 4A). The user may then perform calculations by touching appropriate regions of the display with the pen 4.

In addition to the image of a calculator, the microprocessor 10 causes the display to include a region labelled "full boot". If a user touches a pen on this region, the microprocessor 10 responds by switching to the second operating program. At the same time, the microprocessor 10 issues a command to the power control circuit 21 which causes it to energize all of the back-lighting light sources and issue an enable signal on CTRL 2 as well. Consequently, the whole display becomes active.

The second operating program is graphical user interface based (GUI-based) operating system providing an environment in which various application programs, e.g. wordprocessors, spreadsheets etc., may be run. These programs may be preloaded into the ROM 12, or may be loaded from the optional disk drive or an external ROM cartridge connected to the card interface 13.

Figure 4B:
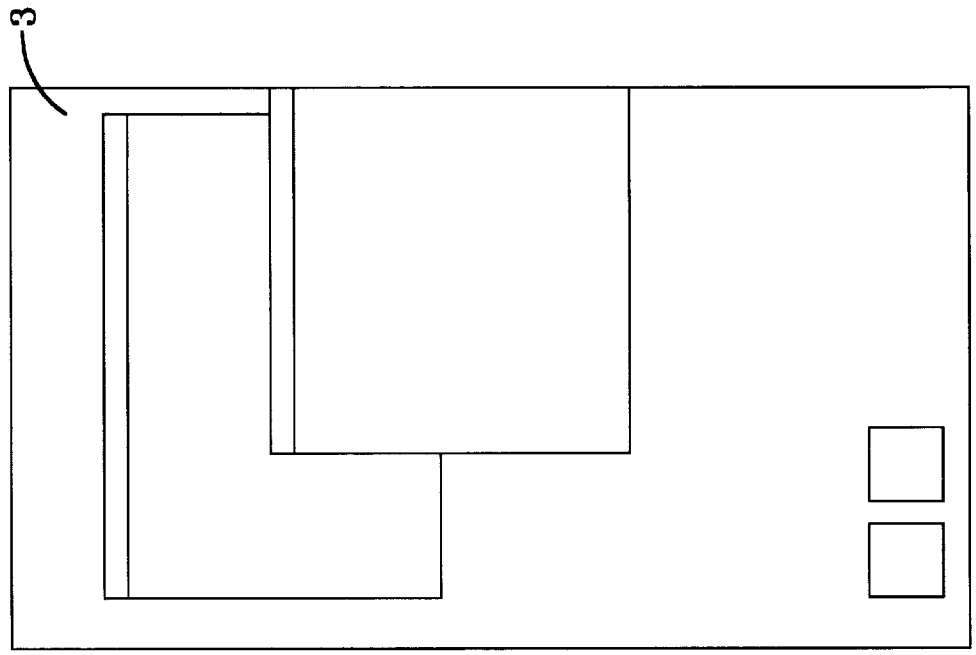
FIG. 4(b) shows the display in a second mode in which the whole display is used.
Figure 4A:
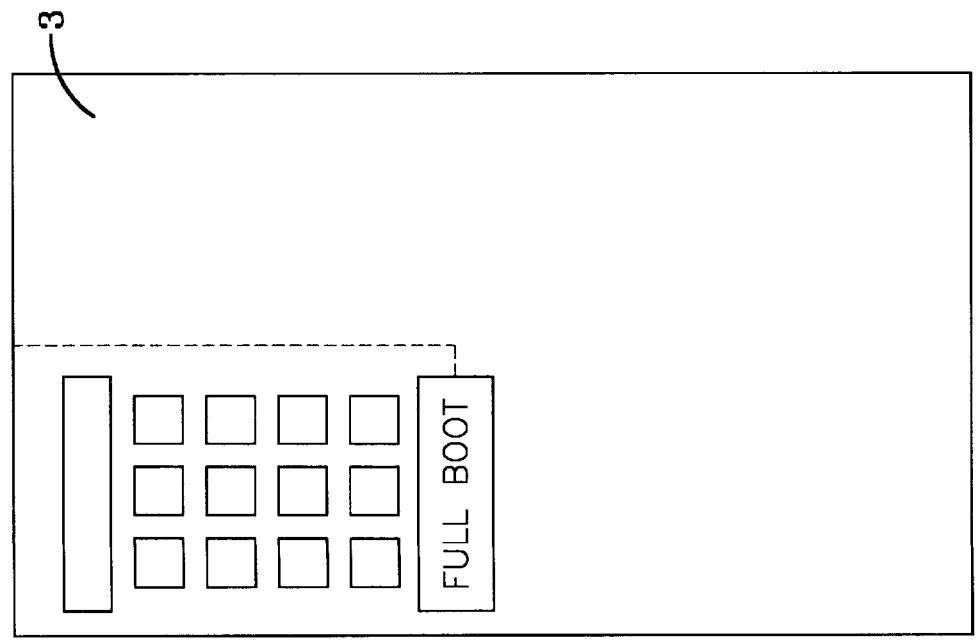
FIG. 4(a) shows the display of FIG. 1 in a first mode in which only a portion of thereof is used.

The arrangement shown in FIG. 4 is suitable for a 320 times 128 pixel display. It will be appreciated that the display having a higher resolution may be controlled by increasing the number of command drivers and segment drivers and suitably distributing signals on the CTRL 1 and CTRL 2 lines. FIG. 4(a) shows the display in a first mode in which only a portion of thereof is used. FIG. 4(b) shows the display in a second mode in which the whole display is used.

A second embodiment of the present invention will now be described.

Figure 5:
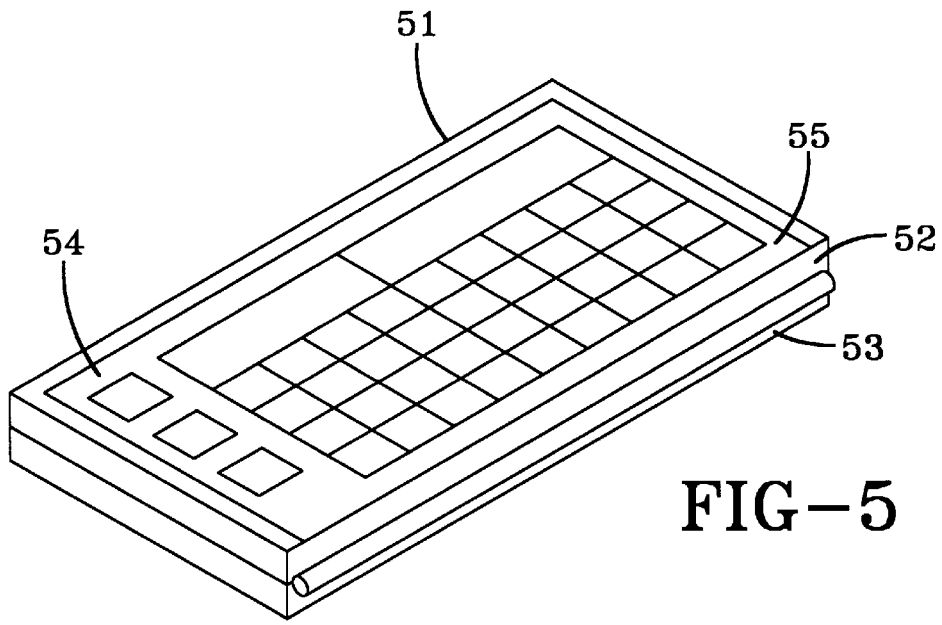
FIG. 5 shows a folding PDA according to the present invention in its folded configuration.
Figure 6:
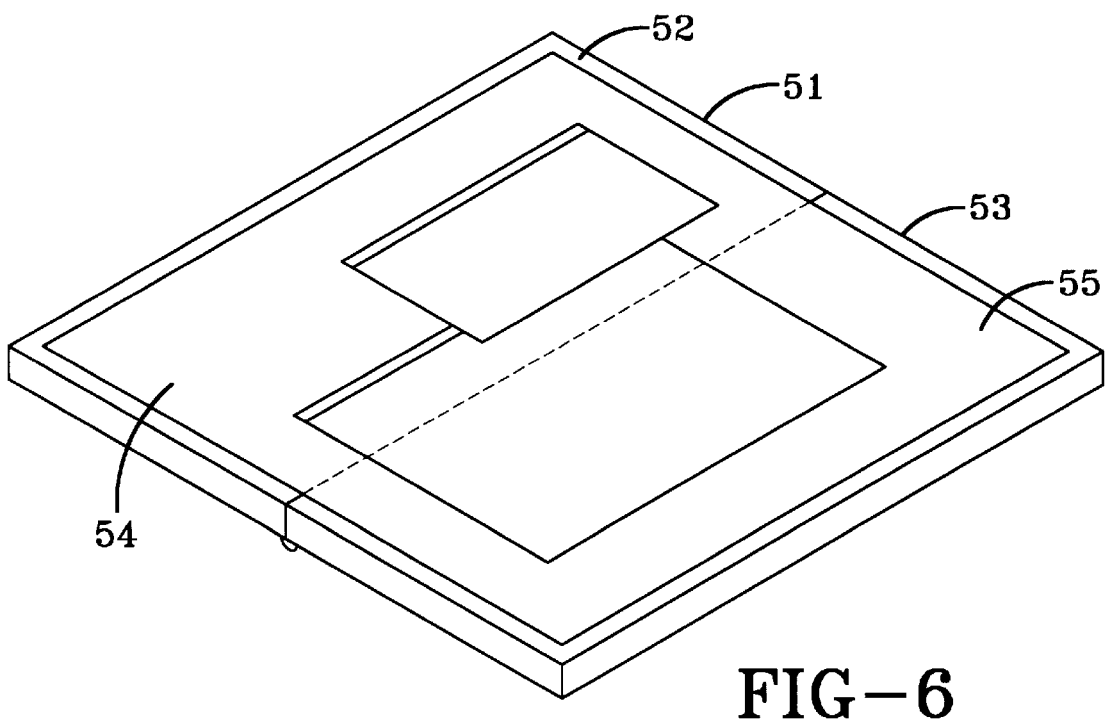
FIG. 6 shows the PDA of FIG. 5 in its open configuration.

Referring to FIGS. 5 and 6, a PDA 51 comprises hingedly coupled first and second body portions 52, 53. Each body portion is provided with a combined display panel and digitizer tablet 54, 55.

Logically, the panels 54, 55 can be considered to be a single display panel and can be controlled by circuitry as shown in FIG. 3. The internal circuitry of the PDA 51 conforms generally to that shown in FIG. 2.

When the PDA 51 is switched on in its folded condition, it operates according to a first operating program. The first operating program provides a plurality of functions and ensures that only the required area of the first panel is activated. For instance, a clock function would only require a quarter of the first panel 54, a calculator or diary function would only require one half of the first panel 54 and a simple e-mail function would make use of the whole of the first panel 54.

Should the PDA 51 be unfolded, a switch in the hinge is closed, signalling to the PDA's microprocessor that it must start operating according to a full GUI-based operating system as shown in FIG. 6.

The present invention has been described with reference to apparatus wherein user inputs are made using a digitizer tablet and pen. It will be appreciated, however, that other forms of input means may be employed, including touch-sensitive display panels, keypads, keyboards and voice recognition means.

Furthermore, the present invention is not restricted to two "boot" levels and a larger hierarchy of "boot" levels may be employed with the possibility of the levels being passed through in different orders. Different input means may be used at different "boot" levels. For instance, a touch-sensitive display may be used for a simple calculator function but voice recognition used when a full operating system program is running. The lower boot levels may provide different functions which accumulate. For instance, the lowest level would provide a calculator function and the next provide a telephone book function, whilst continuing to provide the calculator function. In this case, different boot levels would use different area of the display.

An apparatus according to the present invention may be provided with solar cells in a conventional manner. The apparatus may be configured to operate only on power from the solar cells at low "boot" levels and on both power from the solar cells and batteries at higher "boot" levels.

Many modifications can be made to the above-described embodiments without departing from the spirit and scope of the claims appended hereto.

What is claimed is:

1. A portable computer apparatus comprising:

a display;

user input means;

a memory storing program data; and a processor, connected to the memory for reading program data therefrom, for controlling the display in dependence on user inputs made using the user input means and program data read from the memory, wherein the program data comprises instructions which cause the processor to perform the steps of:

displaying a first image related to a first program while using only a portion of said display;

responding, while using throughout only said portion of said display. to a first user input, made by means of the user input means while said first image is being displayed using only said portion of said display, to display a second image, also related to said first program, using only said portion of said display; and responding to a second user input, made by means of the user input means while said second image is being displayed, to display a third image, related to a second program, while using the whole of said display.

2. An apparatus according to claim 1, wherein;

the display is a liquid crystal display panel;

the apparatus includes a plurality of command and segment drivers;

the program data includes instructions for controlling the processor to enable and disable at least one of the command drivers and at least one of the segment drivers;

at least one of said command drivers and at least one of said segment drivers are disabled by the processor while said first and second images are being displayed; and none of said command and segment drivers are disabled by the processor when the third image is being displayed.

3. An apparatus according to claim 1, including a plurality of light sources for back-lighting the display, wherein the program data includes instructions for controlling the processor to energize a subset of said light sources when the first and second images are being displayed, so as to illuminate said portion only, and to energize all of the light sources when the third image is being displayed.

4. An apparatus according to claim 1, wherein the user input means includes a digitizer tablet and pen therefor.

5. An apparatus according to claim 4, wherein the digitizer tablet overlies the display.

6. An apparatus according to claim 1, comprising first and second hingedly coupled body portions wherein the display is distributed between the body portions.

7. An apparatus according to claim 6, wherein the user input means comprises a switch closed by opening of a hinge coupling said body portions.

8. An apparatus according to claim 1, wherein said program data includes a first program for controlling the processor when said first and second images are being displayed and a second operating program for controlling the processor to operate according to a general purpose GUI operating system when the third image is being displayed.

9. An apparatus according to claim 1, wherein the program data includes a general purpose GUI-based operating system and said third image is a graphical user interface image for said GUI-based operating system.

10. An apparatus according to claim 9, wherein the display is operated in portrait mode when the third image is being displayed.

11. An apparatus according to claim 10, wherein said portion of said display comprises an upper region of the display.

* * * * *

UNITED STATES PATENT AND TRADEMARK OFFICE
CERTIFICATE OF CORRECTION

PATENT NO. : 6,137,481
DATED : October 24, 2000
INVENTOR(S) : John Quentin Phillipps It is certified that error appears in the above-identified patent and that said Letters Patent is hereby corrected as shown below:

In the drawings, Sheet 2, FIG-2 with regard to the boxes identified by the reference number 3, delete "PERSONAL DIGITAL ASSISTANT (PDA)" and insert -- DIGITIZER TABLET/LCD --; with regard to the arrow interconnecting the boxes identified by 3 and 18 the arrow should be two-way rather than the shown one-way arrow.

In the drawings, Sheet 3, FIG-3 with regard to the box identified by reference number 3, delete "PERSONAL DIGITAL ASSISTANT (PDA)" and insert -- DIGITIZER TABLET/LCD --.

Signed and Sealed this

Eighth Day of May, 2001

*Attest:*

NICHOLAS P. GODICI

*Attesting Officer*     *Acting Director of the United States Patent and Trademark Office*